July 28, 1959 J. K. WOOD 2,896,888
SPRING SUPPORT
Filed Oct. 7, 1953 8 Sheets-Sheet 1

INVENTOR:
JOSEPH KAYE WOOD
BY
Curtis, Morris & Safford
ATTORNEYS:

July 28, 1959     J. K. WOOD     2,896,888
SPRING SUPPORT
Filed Oct. 7, 1953     8 Sheets-Sheet 2

INVENTOR:
JOSEPH KAYE WOOD
BY
Curtis, Morris & Safford
ATTORNEYS:

July 28, 1959

J. K. WOOD 2,896,888

SPRING SUPPORT

Filed Oct. 7, 1953

INVENTOR:
JOSEPH KAYE WOOD

BY
Curtis, Morris & Safford
ATTORNEYS:

July 28, 1959 — J. K. WOOD — 2,896,888
SPRING SUPPORT
Filed Oct. 7, 1953 — 8 Sheets-Sheet 5

INVENTOR:
JOSEPH KAYE WOOD
BY
Curtis, Morris & Safford.
ATTORNEYS

United States Patent Office 2,896,888
Patented July 28, 1959.

2,896,888
SPRING SUPPORT

Joseph Kaye Wood, Stamford, Conn., assignor to General Spring Corporation, New York, N.Y.

Application October 7, 1953, Serial No. 384,691

20 Claims. (Cl. 248—54)

This invention relates to a support for piping and the like, and more particularly to a spring balanced support which permits movement of the supported load up and down for a substantial distance, while affording to the load a more nearly constant supporting force.

The present invention provides an improved constant support having capacity for large loads, or for small, and able to accommodate large or small movements of the supported object, having relatively low static friction, and capable of easily made adjustment while maintaining a constant supporting force in spite of the arcuate movements of the supporting arm and of the radius and amplitude of horizontal movements of the point of connection to the supported object from the supporting arm, within the operating range.

With the continued advances in design of steam power plants, chemical processes, and the like, resulting in larger piping, greater amplitudes of travel of the piping due to thermal expansion and contraction, along with higher temperatures and pressures, there has been a continuing and increasing interest in obtaining a more perfectly constant support for the piping. For example, as set forth in my prior Patents Nos. 1,816,164; 1,937,137; 2,145,704; 2,156,468; 2,208,064; 2,256,784; 2,335,834; and 2,439,067 there are several variable factors in constant support hangers which already have been considered and compensated for in order to approach a truly constant supporting action. However, there are still significant variable factors, discussed below, which have not been considered in the art and which are comparable in magnitude to the compensation factors discussed in these patents. These new factors have become very important because of the increase in weights and sizes of pipe, fittings, coverings, amount of expansion, etc. which are present in modern piping installations.

Prior to the present invention the art has customarily treated piping as if it were a freely suspended load always hanging directly below the end of the support arm or, where horizontal movement of the load has been considered, has used rollers or the like to accommodate this horizontal travel, which arrangements often may be unsatisfactory for reasons discussed below.

I have found that sizeable deviations in the actual support force can occur in spring supports because of (a) arcuate travel of the support-arm load pivot, herein called the arcing factor, (b) distance between the pivot connection to the supported object and the support-arm load pivot, i.e. load rod length and (c) horizontal movement of this pivot connection relative to the support-arm load pivot. These latter two factors may also be considered as a function of the radius and amplitude of horizontal movement of the point of connection to the load relative to the support-arm load pivot.

The use of rollers to enable the support to follow horizontal travel of the load is often unsatisfactory because of the added cost and space needed, and the load often travels a considerable distance before a sufficiently large horizontal component of force is developed to cause them to roll. Furthermore, they do not show at a distance whether they are operable or rusted or binding.

The interaction of these factors set forth above can be visualized by considering the typical support hanger in which the load force is caused to act upon one arm of a pivoted bell crank lever, called the supporting arm, and one or more springs act upon another arm, called the spring lever, producing a moment about the main pivot for the bell crank to oppose the load moment and thus support the load. The load does not act vertically at all times, as it would if the piping were a freely suspended load. The point at which the load moment reaches a maximum depends upon the amount by which the pull of the load deviates from the vertical. The actual load moment at other positions depends, of course, on the angle of the supporting arm to the line of pull of the load. These are affected by the length of the supporting arm, the extent of vertical and horizontal travel of the point of connection to the load and the distance between this point of connection and the supporting-arm load pivot, all of which may vary from installation to installation.

Thus, the moment exerted on the bell crank by an actual piping system is considerably different from that of a freely hanging body. Similarly, the moment about the main pivot caused by the main spring or springs varies in a manner which follows a true sine curve if the spring is arranged so that its distortion is equal to the distance between the spring-anchoring pivot point and the point of connection of the spring to the spring lever. This is called the H=0 condition and the spring moment is modified from a sine curve to the extent that the spring is distorted from the H=0 condition, shown by the curves in Figure 5 of my Patent No. 1,937,135. This follows from the curves and mathematical analysis given in my prior patents. In accordance with aspects of my invention, the spring and load moment curves are enabled to be adjusted substantially into coincidence and much more nearly constant supporting action occurs than in prior devices.

Advantageously, these adjustments may readily be made at installation. This fact, coupled with the resulting constancy of support obtained, reduces the engineering calculations necessary in laying out a plant or process and yet provides more precisely known safety factors, which is most important in the modern high temperature high pressure piping systems.

The result of overlooking the factors discussed above is often to subject the piping to sizeable stresses which were not considered in the design of the piping involved. Moreover, the stresses produced by these uncompensated factors are additive, in many cases, along a run of horizontal piping, producing large unbalanced forces in the piping assembly as a whole.

In many cases, I have found that the result of one or more of these factors in a spring support is to produce a type of phase shift between the moment curve of the spring force and the curve of the actual effective load moment arm, causing the vertical component of the load supporting force to be too large over a portion of the travel of the support arm and too small over the remainder of the travel. By adjusting the angular relationship between the supporting arm and the spring lever, these two curves are brought more nearly into coincidence over a large and favorable portion of each curve, and an additional correction force may then be provided over the remainder of the curves to provide a much more nearly constant support action than in prior spring support hangers.

Accordingly, it is an object of my invention to provide a spring support wherein the phase relationship of the spring lever moment curve and the curve of the effective load moment arm can be set or adjustable to compensate for the arcing factor or the radius and amplitude of the horizontal travel of the load relative to the support-arm load pivot or all of them.

In certain instances I have found that the disclosed supports can be adjusted so that the arcing factor effect compensates for the horizontal travel of the load, resulting in a more nearly constant supporting force for the piping and substantially eliminating horizontal forces in the pipes.

An advantage of the present invention over supports using rollers to accommodate horizontal load travel is that where a number of supports are used the horizontal forces developed because of friction and sticking of the rollers are necessarily in the same direction. These horizontal forces thus cumulate along the length of the pipe run, resulting in large troublesome horizontal forces at the end of the run. With the present invention adjacent pairs of spring supports can be arranged to face in opposite directions so that any slight residual horizontal components automatically cancel out.

In other cases where the horizontal movement of the load is negligible but a large vertical travel exists, these supports may be adjusted so that the support-arm load pivot is offset from a vertical relationship with the point of connection to the load when the supporting arm is in either an extreme or mid-position. The result is that the load rod is caused to swing in opposite directions from a vertical position during expansion or contraction of the pipe. Thus, a more nearly constant supporting force is obtained. A further advantage of this arrangement is that disturbing horizontal components of force which are applied to the pipes by spring supports now in use are substantially eliminated because the inclination of the support rod away from the vertical is minimized.

Accordingly, other objects of my invention are to provide a spring support which can be adjusted to compensate for deviation in the vertical supporting force due to relative horizontal movement of the load so as to obtain a more nearly constant supporting force.

The constant support devices heretofore known have been designed on a theoretical basis disregarding friction and then have sought to minimize the frictional hysteresis loop by the use of ball, roller and needle bearings. Such roller type bearings in continual rotary operation maintain their efficiency, but when used for relatively static loads over periods of years I have found they may become less efficient than plain bearings and especially of knife edge type bearings. Also, pipe hangars are usually installed in inaccessible places and subjected to all kinds of environments so that they often receive little or no maintenance, causing the roller type bearings to deteriorate. Thus, one of the difficulties with prior spring support design, when applied to the greater loads and travels of today, has been the sizeable static friction. When the supported piping begins to move up or down, it develops more and more unbalance until enough unbalanced force is accumulated to overcome the static friction of the heavily-loaded pivot of the supporting arm.

The present invention utilizes a pair of supporting springs balanced against each other radially of the supporting arm and balanced angularly against the moment of the load connected to said arm; whereby the spring forces produce a pure couple or moment about the pivot, with no resulting force on the pivot bearing due to the spring force. Hence, the static friction at the bearing is greatly reduced, and the more satisfactory plain pivot bearings disclosed herein can be used and yet support the load with a narrower hysteresis loop than in prior supports.

An object of the present invention is to provide a spring support having greater capacity and utilizing inexpensive rugged bearings with reduced loads on them.

Another aspect of the present invention provides a balanced load-force adjustment, so that a support embodying this aspect of the invention can be adjusted to its particular load without unbalancing the spring forces so as to produce resultant force on the pivot bearing. The adjustment for changing the load capacity of the support is located along the axis of the spring lever. Moreover, a turnbuckle arrangement enables the simultaneous and balanced adjustment of two springs. An important feature is that the adjustability of the supporting devices described herein and their standardization to utilize different sizes of spring enables a single size of support to accommodate a wide range of loads and of movements, both vertical and horizontal, and enables an improved load capacity and travel indicator to be used.

Another object of the present invention is to provide a support with readily made adjustments, for adapting the supports accurately to the particular conditions which each encounters, including horizontal movements of the load, vertical position and vertical movements of the load, and arcuate travel of the supporting arm with rise and fall of the load relative to its support point.

A further object of the invention is to provide an indicator arrangement on the outside of the frame of the support which enables simultaneous reading of the capacity adjustment and the vertical position of the support arm. This facilitates the initial adjustment of the support hanger when it is installed and is a great advantage after installation since an inspector walking on the floor can readily tell by looking up at the scale whether the support arm has changed its operating position, indicating a settling in the framework of the building such as to require readjustment of the support.

A further advantage of the present invention is its small headroom requirements. Thus, with a support embodying the present invention the load can be supported relatively close to the underside of a deck or the bottom flange of a beam, and still have a wide range of available vertical motion for the load.

Another advantage of the balanced spring arrangement is that the over-all width of the spring support is reduced over that of known supports of the same capacity which use two springs side by side. In fact, the widths of the disclosed hangers are usually less than the outside diameters of the supported pipes, making installation of the supports possible in almost any place the pipes run, e.g. between two bulkheads.

Among the objects of the present invention are to provide a balanced spring support which is simple in construction, relatively inexpensive and rugged, which has insignificant static friction, so that the support is quick in response to movements of the load, and which can be adjusted to carry with constant support a wide range of loads having a wide variation in the range of movements and is easy to install and inspect in operation.

Although I shall now give specific examples of my invention as shown in the accompanying drawings and described herein and although I refer herein to certain preferences in construction and arrangement of elements and to certain recommendations, and alternatives, it is to be understood that these are not exhaustive or limiting of the invention, but are illustrative of the invention and for the purpose of instructing others in the principles of the invention and the manner of its use, to the end that they may be enabled not only to use it in the particular embodiments shown but to so modify it and adapt it to various needs and conditions of use as to make the invention fully available to the public after the term of this patent has run in its full course.

The spring support shown in Figures 1–6 is a preferred embodiment and is described in detail below. However, for an easier understanding of many aspects of the present invention, reference is made to Figures 7–11.

Figures 7, 8:
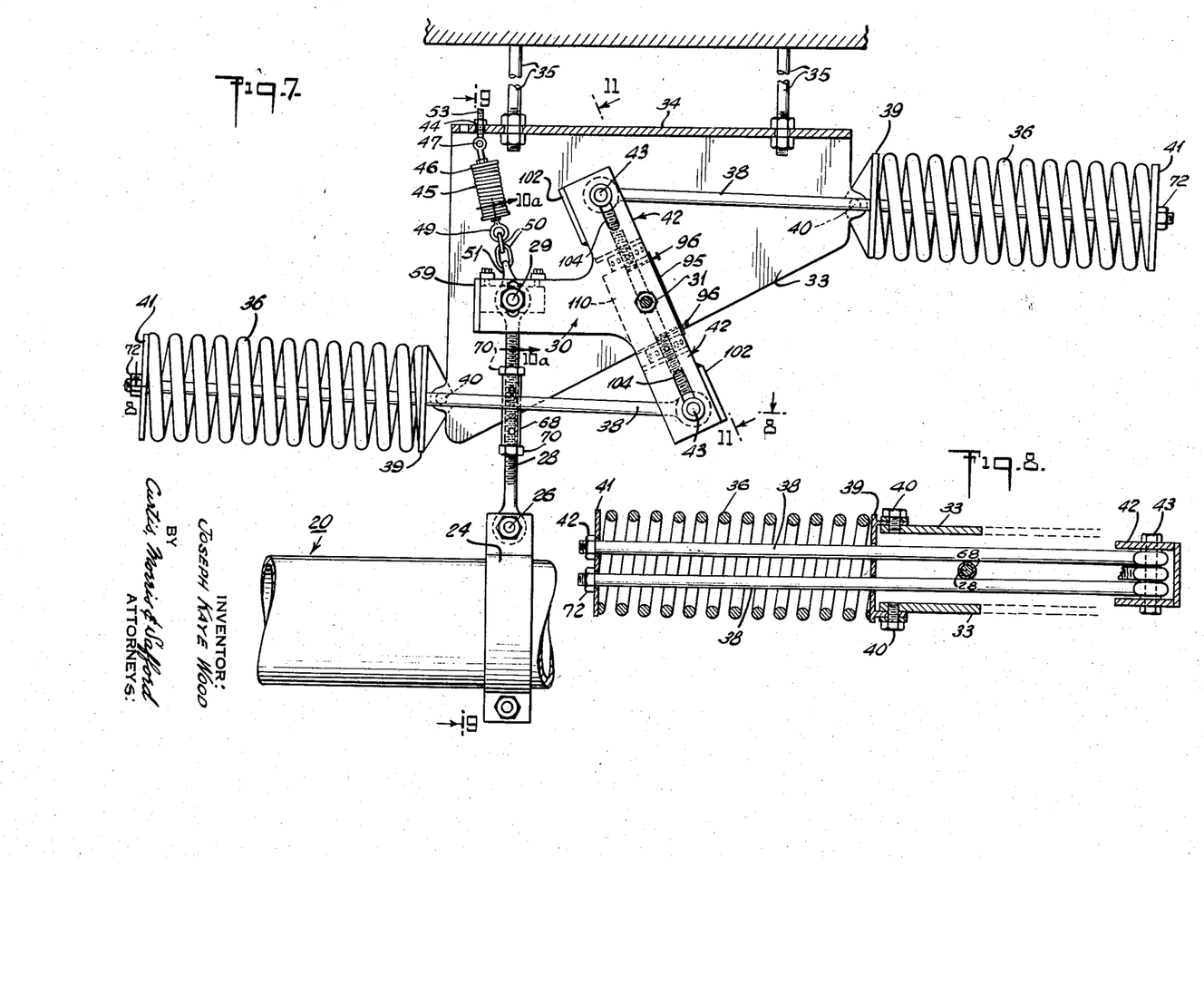
Figure 7 is a partially diagrammatic side elevational sectional view of a modified spring support, embodying the present invention, the section being taken along line 7—7 in Figure 11, looking toward the right.
Figure 8 is a cross sectional view taken along the line 8—8 of Figure 7, looking down, and showing one of the compression springs and spring rods.
Figure 9:
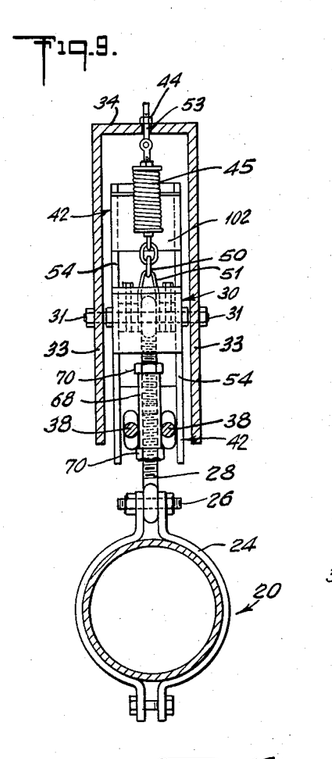
Figure 9 is a vertical cross sectional view through the spring support and supported pipe, taken along the line 9—9 of Figure 7, looking to the right.

As there shown a load, comprising the horizontal section of piping shown at 20, is hung from a spring support device shown generally in Figure 7. The load 20 is held by a pipe clamp 24, pivotally connected at the top by a bolt 26 to a load rod 28, which hangs down from a pivot 29 near the end of a supporting arm 30 in the support device. This arm is pivotally mounted by a main pivot shaft 31 secured by nuts 32 (see Figures 9 and 11) and resting in bearings in the side frame members 33 of the support. As shown, these main bearings are simply formed by polished hard pivot pins operating with generous clearance in Phosphor bronze bushings in the side frame plates 33, thus giving tangential contact like that of a knife edge balance. The whole support may be hung from a beam by means of bolts 35.

The weight of the pipe load 20 pulls down on the support-arm pivot 29 causing the arm 30 to tend to rotate in a counterclockwise direction about main pivot 31. In order to oppose this counterclockwise moment of the load, a substantially pure clockwise couple is produced by lower and upper compression springs 36 acting through pairs of tension rods 38 (see also Figure 8). The inner ends of springs 36 thrust against spring sockets 39 pivotally mounted on the side frames 33 by means of trunnions, shown as bolts 40. The outer ends of these springs bear against spring sockets 41 connected to the tension rods and are free to swing up or down as required by the load movement. Thus, the direction of the pull of the tension rods, pivotally connected to pivots 43 on the ends of the lower and upper spring levers 42 always passes through the axes of their respective trunnions 40.

Figure 10A:
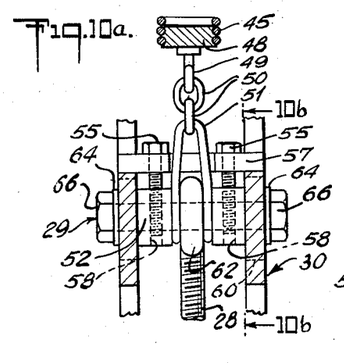
Figure 10a is an enlarged cross sectional view of the load-pivot end of the support arm, taken along the line 10a—10a of Figure 7, looking toward the right.

Connected between pivot 29 and an adjustable clevis bolt 53 (see also Figure 9) secured to top plate 34 and held by an adjustment nut 44 may be an auxiliary booster tension spring 45, the function of which is described more fully below. The top end of the spring is held by a spring plug 46 having an eye 47 pivotally connected to the bolt 53. The lower end of this booster spring (see also Figure 10) is fastened by spring plug 48 having eye 49, shackles 50 and yoke 51 to the pivot bolt 29. This booster spring is adjusted so as to aid in supporting the load when the supporting arm 30 swings below a predetermined adjustable position. It usually is adjusted to begin acting when the arm swings below approximately its mid-range or horizontal position, such as is shown in Figure 7. When the supporting arm 30 rises above the position at which the booster spring takes effect, the yoke, shackle and spring can buckle freely to avoid impeding further upward motion of arm 30.

The precise point from which the booster spring takes effect is determined by adjustment of the clevis bolt 53 and nut 44 relative to plate 34.

The booster spring advantageously is very small relative to the main springs 36 and its total effect only a small fraction of the force of load 20, its purpose being to aid in correcting the deviation in load-supporting force caused by departure of the load rod 28 from a true vertical line of support; but if desired, a part of the load-supporting function can be taken over by the booster as in my Patent No. 2,145,704.

As mentioned in the introduction, the load never acts as a freely suspended body and hence the load rods on the spring supports in use are rarely found in a truly vertical position. This deviation may arise from several factors, and in order to understand the result consider the operation of the support device shown in Figure 7.

The moment about pivot 31 caused by the action of the load 20 pulling down on arm 30 depends upon the relative positions of pivots 29 and 31 and upon the amount by which the pull of the load deviates from the vertical. Generally, the load moment is greatest when pivot 29 is in approximately a horizontal position with respect to pivot 31 and is least when pivot 29 swings farthest above or below pivot 31 because the effective moment arm of the supporting arm is reduced by the greatest amount in these extreme positions.

Similarly, the moment about pivot 31 caused by the springs 36 varies from a maximum when the spring levers 42 are in a predetermined position to minima when they swing furthest in either direction therefrom.

Figure 10B:
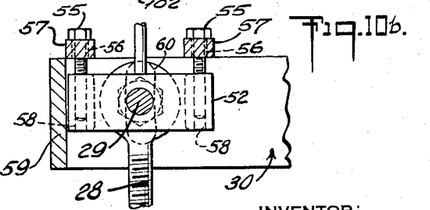
Figure 10b is an enlarged partial longitudinal sectional view taken along the line 10b—10b in Figure 10a, looking toward the left.
Figure 11:
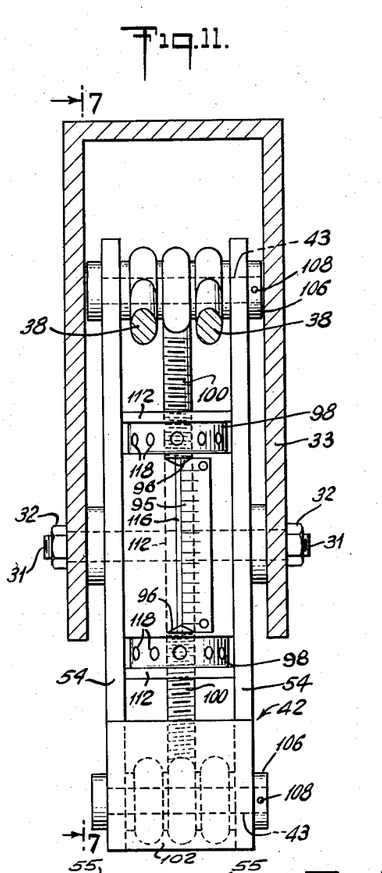
Figure 11 is an enlarged transverse sectional view taken along the line 11—11 of Figure 7, looking downwardly toward the left, to show the adjustable dual spring levers and capacity indication scale.

Adjustment of the position of the pivot 29 relative to the levers 42 about the pivot 31 shifts the phase of the load moment curve relative to the spring moment curve (i.e. the relative positions of the maxima). (See also Figures 10a and 10b.) To facilitate such adjustment, the pivot 29 extends through a horizontal hole in an adjustable block 52 fitted freely between the sides of the supporting arm 30. These sides are formed by ends of a pair of Y-shaped members 54 seen edge on in Figures 9 and 11 and held in parallel spaced relationship to form arm 30 by a cross piece 59 welded across their ends. Adjustment bolts 55 extend down through vertical holes 56 in a pair of cross pieces 57 and into threaded holes 58 in the block 52. As shown in Figure 10, the pivot shaft 29 projects out on either side of block 52 through arcuate slots 60 in the sides of supporting arm 30, which are concentric with main pivot 31. Thus, screwing up or unscrewing the bolts 55 raises or lowers the pivot 29 in the slots 60, while maintaining concentricity in arcuate slots 60. To allow for slight longitudinal motion of the block 52 and bolts 55 with the pivot shaft during adjustment, the holes 56 are enlarged in the direction of the length of the arm 30, as seen in Figure 10b. A central vertical flared hole in block 52 receives the ends of the yoke 51 (Figure 10a) and an eye 62 on the upper end of the load rod 28 in position to be connected to the center of pivot shaft 29, and with enough clearance that yoke 51 and load rod 28 can freely swing around pivot 29 independently of each other within the limits of their operation, e.g. approximately 70°. The outer ends of the pivot shaft 29 are threaded, and a pair of washers 64 and nuts 66 hold it in place. These nuts may be tightened against sides 54 when the block 52 has been adjusted.

Where the operating conditions are fully specified and the parts to be supported can all be weighed, the position of pivot shaft 29 can be accurately determined and the adjustment block 52 and associated parts may be omitted, a pair of circular holes being accurately drilled, either during manufacture or at the construction site.

Load rod 28 is provided with a turnbuckle 68 and locknuts 70 to adjust its length.

Figures 15A, 15B:
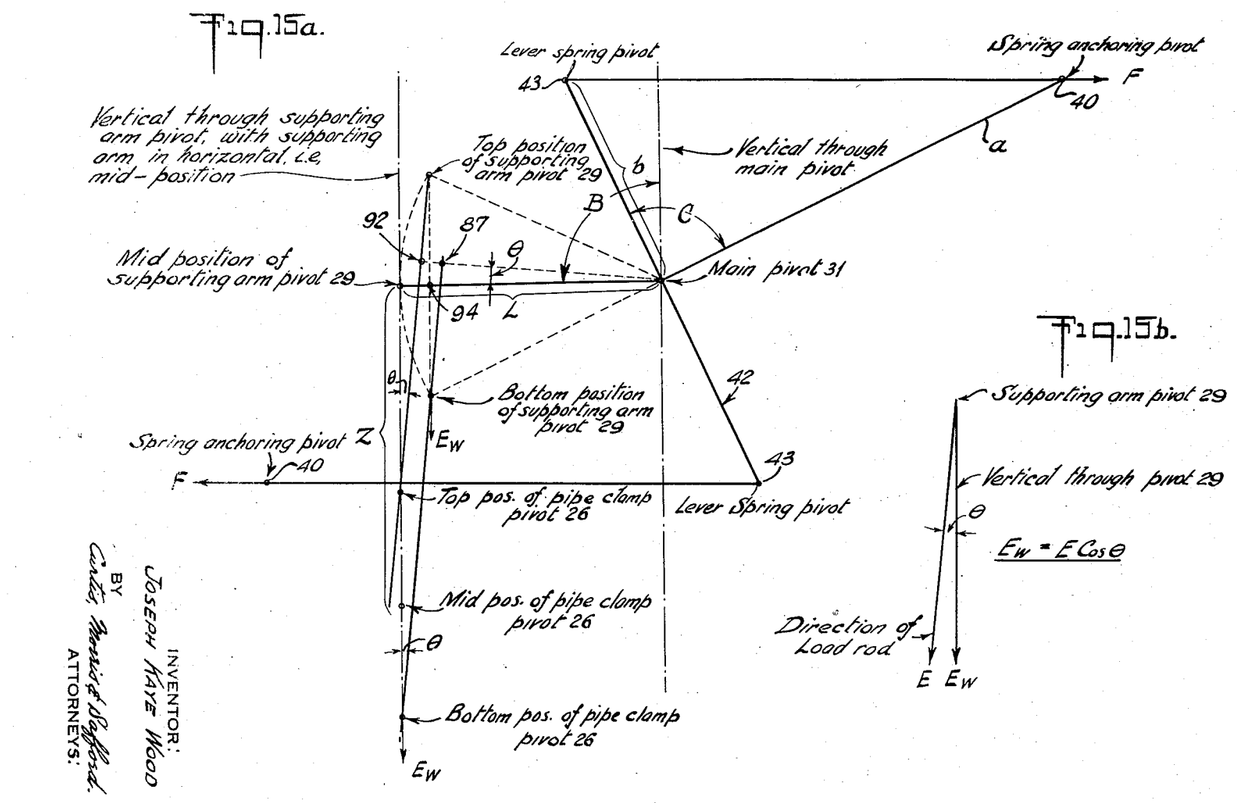
Figures 15a and 15b are force and dimension diagrams for purposes of explanation.

The analysis of the operation of a constant support spring hanger is set forth in my Patent No. 2,145,704, dated January 31, 1939, and will help to explain my present invention. The following analysis is general and applies to all constant support hangers utilizing a spring acting on one arm of a bell crank lever system to support a load force acting on the other arm. Merely to help in visualizing the operation and to aid in description this analysis is sometimes referred to the device shown in Figure 7. Referring primarily to Figures 7 and 15a of this application:

$k$=the load/deflection ratio, i.e., stiffness factor of the main spring system, e.g. in Figure 7 it is that of each of the main springs 36.

$a$=the distance and direction from the main pivot to either of the spring-anchoring pivots or trunnions; in Figure 15a only the triangle for the upper spring 36 and its lever 42 is labelled, to simplify the diagram.

$b$=the distance between the main pivot and the lever pivot upon which the spring acts; that is, $b$ is the effective length of the levers, e.g. in Figure 7 it is the effective length of either spring lever 42.

$C$=the angle between $a$—$b$.

$B$=the angle between the vertical and the axis of the supporting arm from its main pivot to its load suspension pivot.

$H$=the relaxed length of the main spring system and its connections, i.e. the distance which would be measured between the spring-anchoring pivot and the lever pivot upon which the spring acts if the lever pivot shaft were removed from the spring lever and the spring allowed to expand or contract to its fully relaxed position; that is, in Figure 7, if either pivot shaft 43 were released from its lever 42. When $H=0$, the distance between either of the spring-anchoring pivots 40 and the corresponding lever spring pivots 43 is always equal to the amount of deflection of the spring.

As shown in my Patent No. 2,145,704, the formula for the moment $m_s$ of the spring system acting to turn the spring lever about the main pivot; e.g. the moment of either of the springs 36 in turning its lever 40 about main pivot 31 can be expressed in the above defined terms, as follows, where the subscript $s$ denotes the spring moment.

(1) $\quad m_s = kab \sin C \left(1 - \dfrac{H}{\sqrt{a^2 + b^2 - 2ab \cos C}}\right)$ In the balance spring system of Figure 7, the total moment $M_s$ of the two springs is effectively twice this amount, slight variations in the stiffness factors $k$ being compensated for by opposite adjustments in lever lengths $b$.

(2) $\quad M_s = 2m_s = Kab \sin C \left(1 - \dfrac{H}{\sqrt{a^2 + b^2 - 2ab \cos C}}\right)$ where $K=2k$, the effective load/deflection ratio, or stiffness factor, of the two springs 36 acting together.

The formula for the spring-moment curve, given above in (2), reduces to the following pure sine curve when $H=0$:

(3) $\quad M_s = Kab \sin C$

Desired values of H are attained in my present structure by adjusting the effective length of the tension rods 38 by means of the nuts 72. In the following description it is assumed that H has been adjusted to equal zero so that simplified Equations 3 above and 4 below apply; but the invention is not limited to such adjustment. The effect of a finite value of H is shown by comparison, in Figure 5 of my Patent No. 1,937,135, of curve a, which is a pure sine curve occuring when the relaxed length H is made equal to zero, with curve b, which is distorted by the value of H being substantially greater than 0, so that the spring remains relaxed until the bell crank lever reaches a substantial angle beyond the in-line position (0°). Obviously an infinite number of such curves is available.

Figure 16:
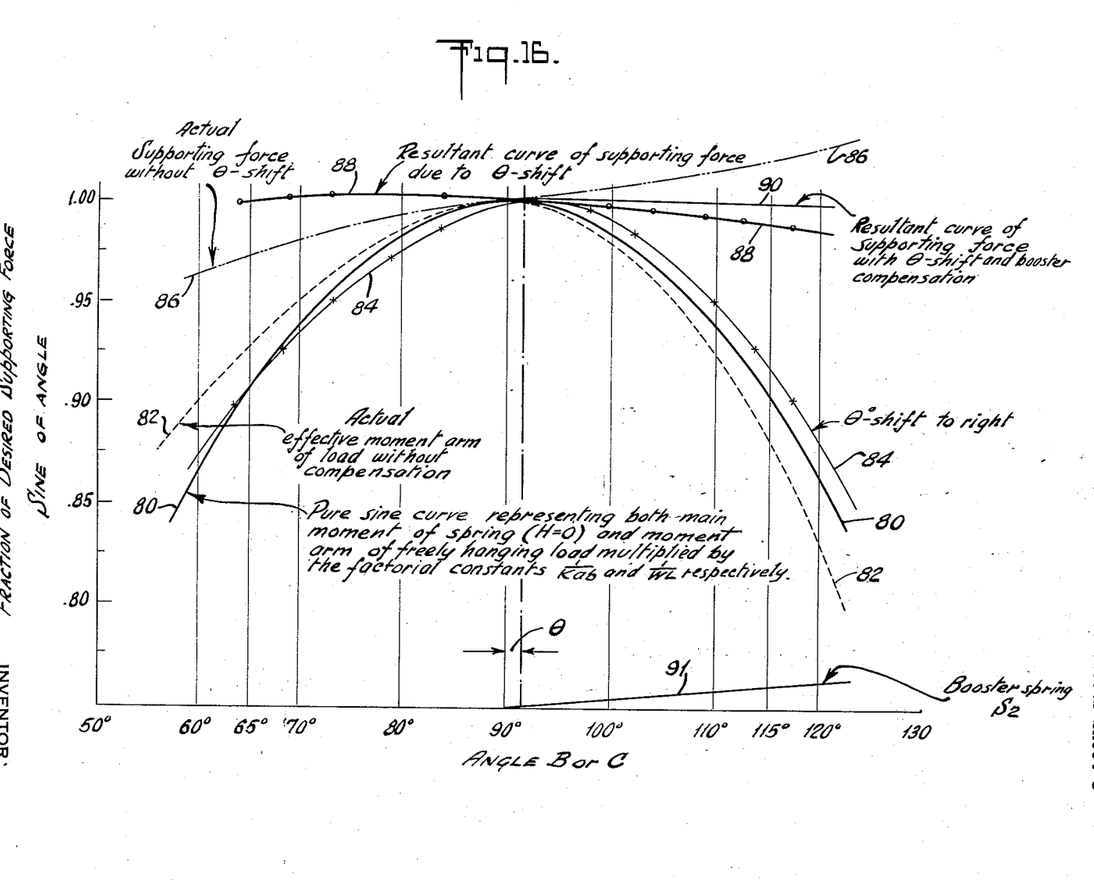
Figure 16 is a graph of forces, moments and moment arms as a function of the position of the support arm of the spring support shown in Figure 7.

In Figure 16 the curve 80 represents the moment curve, when $H=0$, of a spring system acting on its lever arm. It is a pure sine curve, and has a maximum when C equals 90°. The solid line curve 80 is obtained by plotting normalized values of the spring moment as a function of the angle C as explained below. The absolute values at each point along such a spring moment curve depend upon the capacity of the support device being considered, and hence to make the curves general in applicability they are shown as normalized curves, i.e. in terms of unity. With reference to the support device of Figure 7, in order to obtain a normalized curve, both sides of Equation 3 are multiplied by the factorial constant $1/Kab$. Thus the normalized curve 80 is a plot of:

(4) $\quad M_s/Kab = \sin C$

The same curve would result from plotting in terms of angle B normalized values of the moment of the load if freely suspended from the supporting arm.

The abscissae for all curves in Figure 16 are in degrees of angle, i.e. either angle B or angle C, depending upon whether the load-supporting arm or spring lever is involved with the particular curve under consideration. The ordinates of all of these curves are normalized so that they can be plotted in terms of unity, for purposes of comparison. Curve 80 is a normalized moment curve. Curve 82 is a normalized curve of the actual effective moment arm in exerting a vertical supporting force on the load. Comparisons should be made between the values of the "Sine of Angle" represented by the true sine curve 80 and the value found on the moment or moment arm curve under consideration. Curves 86, 88 and 90 are curves of force normalized by dividing by the weight of the load. Comparison should be made between the desired supporting force (which is unity on these curves) and the value found on the curve under consideration. Thus the relative values on the force curves can be understood to mean "Fraction of Desired Supporting Force."

In order further to consider the operation of this support, the following definitions should be kept in mind:

$L$=the effective length of the supporting arm 30, that is, the distance between pivots 29 and 31.

$Z$=the load rod length, that is, the distance between pivots 29 and 26.

$W$=the actual load weight to be supported.

$E_w$=the vertical component of the supporting force.

$E$=the actual tension exerted on the load rod.

$\theta$=the angle between the vertical and the actual line of pull on the load.

The load moment may be expressed as follows, where the subscript W denotes that the weight of the load is involved:

(5) $\quad M_w = WL \sin B$

This formula may be normalized by multiplying both sides by $1/WL$, giving:

(6) $\quad M_w/WL = \sin B$

This pure sine curve may also be represented by the solid line curve 80 shown in Figure 16 considered as plotted in terms of angle B.

In the curve 80 it is assumed that the pipe load rod 28 was free always to hang plum from the supporting arm load pivot 29, and thus a truly constant-pull supporting action could be obtained. This freely hanging condition is seldom obtained in actual piping installations.

Assuming first for sake of simplicity an installation in which the piping has substantially no horizontal movement but does move vertically up and down over a considerable distance with changes in temperatures in the pipes. The supporting arm 30, when following such movement, must carry pivot 29 along an arc (Figure 15a), e.g. from $B=55°$ or $60°$ through its mid-position to $B=120°$ or $125°$. In Figure 15a it is further assumed that the operating range of the bell crank assembly 30, 42 is such that the supporting arm 30 swings about the same distance above the horizontal as it does below the horizontal. This condition gives the maximum vertical component of travel of the supporting arm load pivot 29 for the least horizontal component. Nevertheless, if with pivot 29 in its horizontal mid-position the load rod hangs vertically then the load rod becomes canted to an angle $\theta$ (with the vertical) when the pivot 29 is either above or below the horizontal.

This canting of the load rod, which heretofore has been overlooked or treated as insignificant, I have found to have a startling effect upon the supporting force actually exerted on the load. Actually it is as significant as other factors which have caused much concern and have been the object of a number of patents.

An analysis shows that when the piping is in its top position, the actual moment arm of the load-supporting arm 30 (shown by the perpendicular distance from the main pivot 31 to a point 92 on the line between pivots 26 and 29) is greater than it would be in the case of the horizontal distance from pivot 31 to a point 94 on a vertical through pivot 29, which is the actual moment arm for a freely hanging load. Because of the canting of the load rod 28 to an angle $\theta$, the actual effective moment arm of the load-supporting arm 30 in providing a vertical force to the load is the actual moment arm multiplied by $\cos \theta$, for the vertical component of the supporting force $E_w$ is less than the tensile force E in the load rod, as shown in Figure 15b.

In terms of operation, this means that the moment of the load is not accurately balanced against the spring moment. On Figure 16 this is shown by the curve 82, representing the actual effective moment arm of the load, departing from curve 80 representing the spring moment. The normalized actual supporting force is plotted on Figure 16 as curve 86, which is obtained by dividing the spring moment curve 80 by the actual effective load moment arm curve 82, giving the actual supporting force in terms of unity.

The actual supporting force $E_w$ represented by the dash and double dot curve 86 is too low (i.e. less than 1.00) when angle B is less than 90°.

The reverse is true when angle B is greater than 90°. For example, the actual moment arm of the load lever when in its bottom position is the perpendicular distance from pivot 31 to a point 87 on the load rod's line of action through the bottom positions of pivots 26 and 29. This is less than it would be if the load were freely hanging, which is the distance from pivot 31 to the point 94. Thus, the load moment arm curve 82 is too small relative to the spring moment curve 80 when angle B is greater than 90°, and the supporting force $E_w$ is too large.

The desired value for the vertical supporting force is:

(7) $\quad E_w = W$ (desired condition)

The actual vertical supporting force $E_w$ is a function of the actual tension E, exerted along the load rod, and the angle $\theta$ by which the load rod deviates from the vertical:

(8) $\quad E_w = E \cos \theta$

I. *When B is less than 90°*

The load rod tensile force E times the actual moment arm of the supporting arm length L must equal the moment of the springs $M_s$:

(9) $\quad EL \cos [90° - (B+\theta)] = M_s$

This can be rewritten as:

(10) $\quad E = \dfrac{M_s}{L \sin (B+\theta)}$

Substituting this in Equation 8:

(11) $\quad E_w = \dfrac{M_s \cos \theta}{L \sin (B+\theta)}$

Using trigonometric relationships:

(12) $\quad E_w = \dfrac{M_s \cos \theta}{L(\sin B \cos \theta + \cos B \sin \theta)}$ $\quad = \dfrac{M_s}{L(\sin B + \cos B \tan \theta)}$ From Figure 15a it is seen that $\tan \theta$ can be expressed in terms of known factors as follows:

(13) $\quad \tan \theta = \dfrac{L - L \sin B}{\sqrt{Z^2 - (L - L \sin B)^2}}$

Substituting in Equation 12:

(14) $\quad E_w = \dfrac{M_s}{L \sin B + \dfrac{\cos B (L - L \sin B)}{\sqrt{Z^2 - (L - L \sin B)^2}}}$ Although the desired conditions is expressed by Equation 7, $E_w = W$, I have found that when this is applied to Equation 5 it does not give directly the result desired. I have found it necessary to modify the moment arm, $L \sin B$, by an "arcing correction factor":

$$\dfrac{\cos B (L - L \sin B)}{\sqrt{Z^2 - (L - L \sin B)^2}}$$

This "arcing correction factor" is the amount by which the actual effective load moment arm is too large when angle B is less than 90°, under the conditions specified.

II. *When B is greater than 90°*

(15) $\quad EL \cos [90° - (B-\theta)] = M_s$

The only difference between this equation and Equation 9 is in the sign of the angle $\theta$.

Carrying the analysis through in steps parallel to those shown by Equations 10 through 14 above, the following equation for $E_w$ results:

(16) $\quad E_w = \dfrac{M_s}{L \sin B - \dfrac{\cos B (L - L \sin B)}{\sqrt{Z^2 - (L - L \sin B)^2}}}$ In this case, when angle B is greater than 90° the "arcing correction factor" has a negative sign, showing that this factor is the amount by which the actual moment arm is too small.

To illustrate the serious effect which the deviation can have, if uncorrected, assume operating conditions under which the supporting arm 30 is swinging only 25° above and below the horizontal (which is less than often occurs) and assume that the load rod is the same length L as the supporting arm 30 (which is not unusual). Then the deviation of the supporting force (above and below the desired value) is plus and minus 4%, the total variation in the supporting force being 8% as calculated from the formulas 14 and 16, which may be a significant amount seriously affecting the factor of safety in a critical piping system. If horizontal travel of the load occurs this deviation may be greater.

If the supporting arm were swinging 35° above and below the horizontal, the total variation in the supporting force obviously would be to an extent that raises a serious question whether devices so operating may be designated "constant-support," even when $H=0$.

In order to correct for this arcing deviation factor, an adjustment (called "$\theta$-shift") is made in the angular relationship of the load suspension pivot 29 to the spring pivots 43 about main pivot 31. In the case under discussion, the bolts 55 (Figures 10a and 10b) are tightened so as to reduce the angle B, for any given value of the angle C, by an amount approximately equal to the maximum value of the deviation angle $\theta$ for the installation under consideration. The result of this is shown graphically on Figure 16, namely the shifting of the actual effective moment arm curve 82 bodily to the right, by an amount equal to this maximum value of $\theta$; so that it becomes curve 84. For other cases, as where the load rod is not the same length as the supporting arm, or where the load has horizontal components of motion, then the "$\theta$-shift" used may be more or less than the maximum deviation angle $\theta$ of the line of pull of the load from the vertical.

This $\theta$-shifted curve 84 follows quite close to the true sine curve 80, for values of B less than 90°. By dividing the values along curve 80 by the respective values along curve 84, the resulting curve 88 shows the vertical supporting force on the load after the $\theta$-shift of pivot 29. Curve 88 is very near to unity for all values of B less than 90° and within the operating range of the hanger.

For values of B larger than 90° the $\theta$-shift curve 88 is continuously above the true sine curve 80 so that the vertical supporting force curve 88 on the load is too small above 90°, sloping downwardly to the right along almost a straight line path. In order to compensate for any droop of the right side of curve 88, which occurs particularly when there is a horizontal pivot movement of the pipe clamp pivot, a booster spring 45 is provided. This spring provides a straight line increase of force as shown by curve 91 for spring $S_2$ but acts only when angle B is in the upper quadrant (in the right side of the Figure 16 graph). The slope of curve 91 depends upon the stiffness factor, i.e. load/deflection ratio of the spring 45. The resultant curve 90, representing the actual supporting force of the device after $\theta$-shift and with the booster spring, is very near to unity.

If instead of positioning the hanger with pivot 29 vertically above pivot 26 when arm 30 is horizontal, it is positioned beneath the position of pivot 29 when one quarter way up or down from the limits of its operation range, the deviation will be one half to the right and one half to the left. With such an arrangement the curve 82 would be brought closer to curve 80 except in the vicinity of 90°, where it would be spaced below it. Somewhere near to the one-quarter and three-quarter position (which in the case of a limit of 25° above and below horizontal are at 77.5° and 102.5°) these curves would cross. This expedient is sufficient for small deviations but larger deviations require compensation which can best be achieved by the $\theta$-shift and booster spring described above.

Also, it is to be noted that where curve 82 is below curve 80 in the mid range, there may be an advantage in changing the spring characteristic away from an $H=0$ condition to obtain additional compensation.

Horizontal components of movement of the load give a deviation analagous to the horizontal component of the arc of the supporting arm; and my invention may be utilized to correct that deviation and provide a truly constant support. Assume that the pipe-clamp pivot 26, with the pipes cold, hangs at a given position and that as the pipes come up to operating temperature the pivot 26 rises an amount within the range of the device and moves to the right a distance equal to about ½ this vertical travel. The support 22 is then advantageously arranged so that when the piping is heated to bring clamp pivot 26 to mid-height, the pivot 29 is in mid-position directly above the clamp pivot 26. As the pipe cools down, pivot 26 moves down and toward the left, while at the same time the pivot 29 moves in the opposite direction because of its arcuate path. The result is to produce an arcing factor effect which is about twice that of a purely vertically moving load as was analyzed.

As the pipes warm up from the temperature of mid-position, pivot 26 moves up and to the right while pivot 29 also moves up and to the right. Thus, above mid-position the load acts more or less as a freely hanging load and produces a true sine moment, i.e. the left half of curve 82 would, under such circumstances, substantially coincide with curve 80.

If the vertical movements of the load can be accommodated mostly by the swing of the supporting arm in the range where its horizontal component thus compensates for horizontal movement of the load, no other "arcing correction factor" may be needed; and in practice the arm may swing substantially beyond that range. Where greater amplitude of movements are encountered, it is more satisfactory to use the compensation with booster spring as set forth above.

This compensation for horizontal movement of the load may be made by arranging the hanger so that the horizontal component of the swing of its supporting arm is in the same direction as the horizontal movement of the load above mid-position, i.e. for values of B less than 90°, and then making an adjustment of bolts 72 to bring the left-hand portion of curves 82 and 80 as close together as possible, the right half of curve 82 can then be corrected by a booster spring in the manner described above. A booster spring of above more than customary stiffness would be used because the arcing factor effect is increased by the horizontal component of load travel, which, in this example, is opposite to the horizontal component of swing of the supporting arm when it is below mid-position. Thus, a constant pull is provided to a load with both vertical and horizontal components of motion. If the horizontal component of motion is in the opposite direction, the support is hung in reversed position and the same procedure used. If the amount of horizontal motion is less, then the required amount of $\theta$-shift and booster spring action is correspondingly reduced or the need for it eliminated, as disclosed above.

Considering further the operation and structure of the spring support shown in Figures 7 through 11, the two oppositely acting springs 36 connected to opposite ends of the spring levers 42 produce a pure couple so that the force of the main springs 36 is not imposed on pivot 31. This will be understood by considering the conditions of static equilibrium as applied to the lever system 30, shown in Figure 7.

These conditions are (1) that the sum of the vertical components $F_v$ of the forces acting on the system must be zero, (2) that the sum of the horizontal components $F_h$ of the forces acting on the system must be zero, and (3) that the sum of the moments M about main pivot 31 must be zero.

(1) $\Sigma F_v = 0$
(2) $\Sigma F_h = 0$
(3) $\Sigma M = 0$

From conditions of symmetry it is seen that the vertical and horizontal components of the forces produced by the springs 36 are equal and opposite and cancel out, leaving only a pure clockwise moment acting about the pivot 31, acting to counterbalance the counterclockwise moment of the load pulling on the arm 30. The downward force of the load only is held in equilibrium by the bearings of the main pivot 31, and thus the loading on the pivot 31 is always substantially vertically.

By using single springs projecting from opposite ends of the hanger, its width is held to a minimum, an advantage in installing because the hanger is thus usually narrower than the pipe diameter.

Advantageously, a balanced, axial arrangement is provided for adjustment of capacity to accommodate tolerance variations and a range of load sizes and operating conditions. The effective length of spring levers 42 can be adjusted, simultaneously or individually. A scale, shown, for example, at 95 in Figure 7 and pointers 96 indicate the adjusted positions. The adjustment is made by rotating a pair of disks 98 to screw eye bolts 100 out or in along the length of the levers 42, thus moving the spring pivot shafts 43 respectively, toward or away from the ends of levers 42. Each of these pivot shafts extends through the eye of one eye bolt 100 and the eyes on the ends of a pair of rods 38. The ends of each shaft 43 extend through slots 104 (Figures 7 and 11) in the sides of spring levers 42 parallel to the axis of the levers to guide the adjustment of the shafts 43. The side members 54 are tied together at the ends of levers 42 by cross braces 102.

One end of each pivot shaft 43 is headed and the other end is held by a fastener 106, shown here as a pinned washer secured by a taper pin 108. Upper shaft 43 and its washer fit with clearance inside the side frames 33.

Each of the adjusting nuts 98 is held between the sides 54 of the levers and bears against a block 110 at the hub of the lever system 42, 30 and a cross strap 112. This hub block has a transverse hole fitted to the main pivot shaft 31 and a longitudinal hole 112 in which the inner ends of the turnbuckle eye bolts 100 are received. Pointers 96 project from the inner ends of bolts 100 out through slot 116 in block 110 and over scale 95.

There are slight tolerance variations in the stiffness of springs, and when the support is assembled the adjustment disks 98 may be individually turned to shorten one of the spring levers 42 relative to the other to compensate for the stiffer spring so as to produce a substantially pure couple about pivot 31. This position may be marked on scale 95. Thereafter, if it is necessary to adjust the spring lever arms for a lighter or heavier load, the adjusting nuts 98 are turned simultaneously in the manner of a turnbuckle by means of a two-pronged fork or spanner wrench with prongs spaced to fit into corresponding pairs of holes 118 in the edges of the nuts.

The preferred spring support embodying my invention is shown in Figures 1–6 and is similar in many respects to the support shown in Figures 7–11, and parts performing corresponding functions are designated by like numbers. There are several important features in this embodiment which differ from the other.

Figure 1:
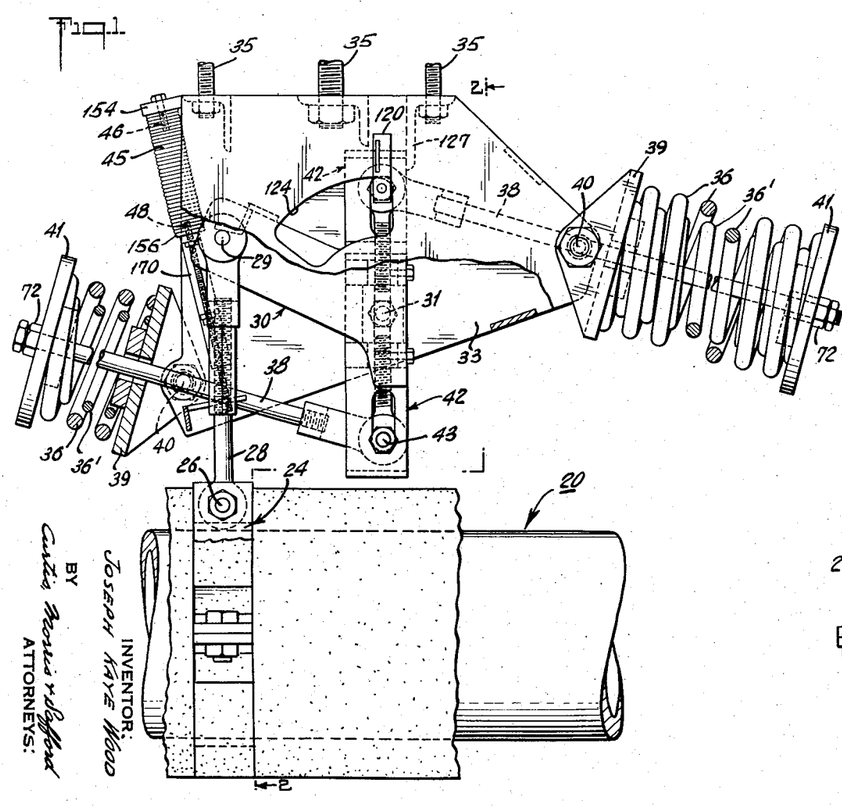
Figure 1 is a side elevational view partly broken away and partially in longitudinal section of a preferred embodiment of the present invention.
Figure 2:
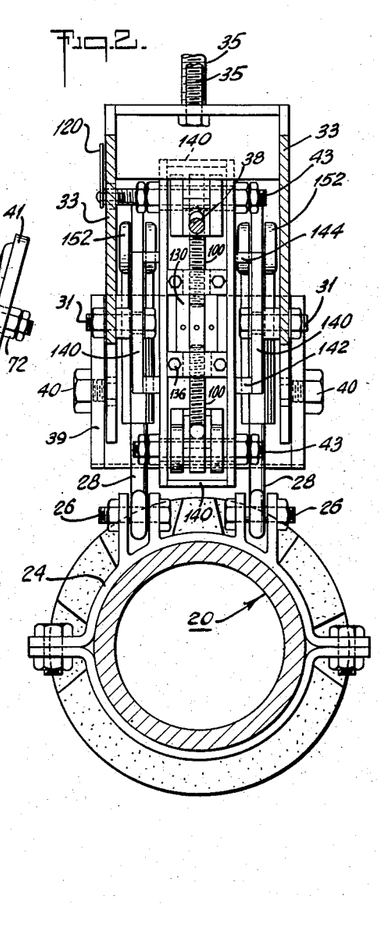
Figure 2 is a cross sectional view taken along the line 2—2 of Figure 1 looking toward the left.
Figure 3:
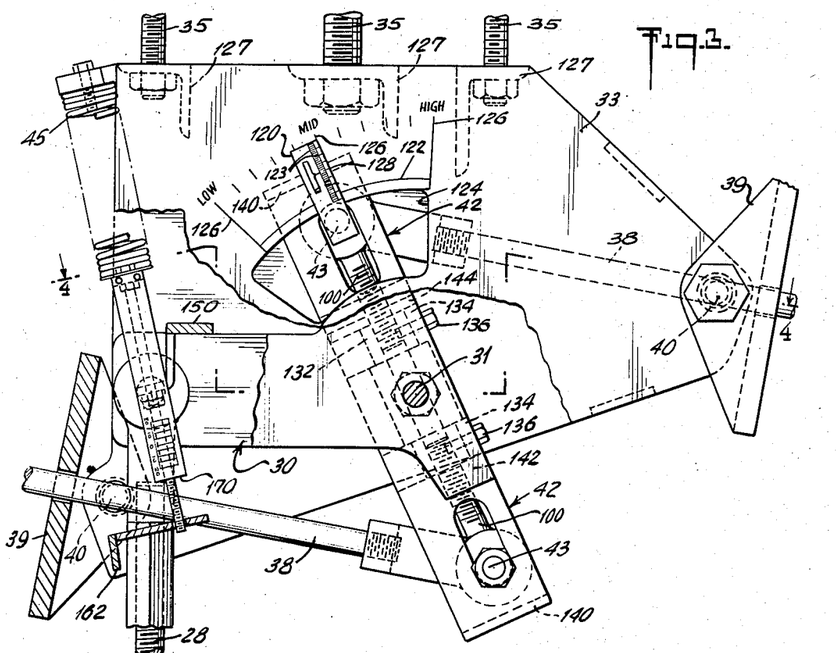
Figure 3 is a side elevation, on enlarged scale, corresponding to Figure 1 but showing the load capacity and support arm travel indicator in a different position from that shown therein.
Figure 4:
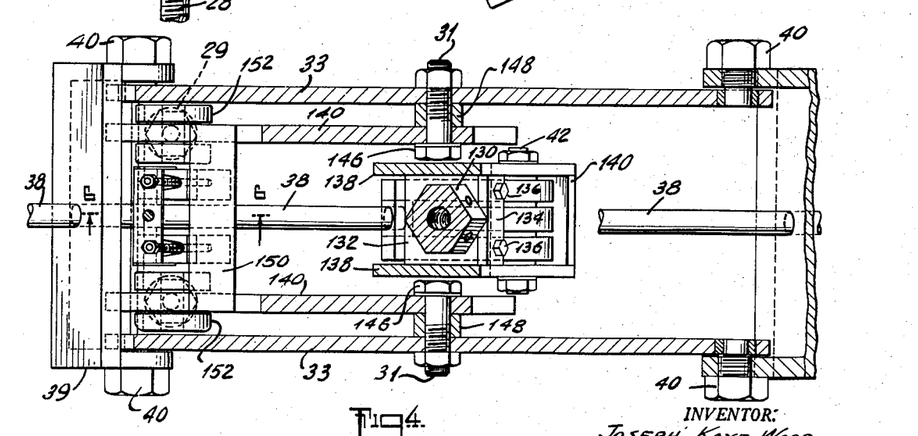
Figure 4 is a plan section taken along the staggered line 4—4 in Figure 3 looking downwardly and showing further details of the main pivot and lever assembly.

As shown in Figures 1, 2 and 3 a combined capacity and travel indicator scale 120 is connected to an extending end portion of the upper pivot 43 and arranged to be read against an arc 122 and graduations scribed on the outer face of one frame member 33 and concentric with main pivot 31. An arcuate window 124 in this frame provides clearance for the end of shaft 43 as it moves due to travel of the load. The position of the load, i.e. "High," "Mid," or "Low" is determined by comparing the scale with the graduations and three radial lines 126 scribed perpendicular to arc line 122. In Figure 1, the load is in top position with the upper lever 42 stopped against one of the three angle braces 127 to which support rods 35 are attached. In Figure 3, the load is at mid-position with the right scale edge of the scale 120 at the "Mid" line.

Simultaneously with the load position the adjustment of the support is read by comparing the scale markings 123 with reference line 122. Mid-scale, shown by arrow 128, is considered "Rated Capacity" and the cardinal scale markings on the inner end of the scale represent, respectively, 5%, 10%, 15% and 20% increase over rated capacity and those on the outer end a corresponding decrease. In Figure 3 the setting reads about 18% increase.

An advantage of this support is that its actual capacity can be varied by changing the inner and outer coaxial springs 36 and 36'. Both are shown but either or both may be used for different sizes of load. It is possible to omit one of the springs on each side or to use lighter springs on each side; and where the loads are lighter, so that the static friction is less important, it is possible to use only one or both springs acting on one lever and to omit the lever and spring assembly on the other side of the main pivot. Single spring rod clevis bolts 38 are used instead of the pair of rods shown in Figure 8.

The "Rated Capacity" of each support is determined by calculation or testing and is stamped on the scale plate 120 or on the frame.

The adjustment of the capacity is made by a hexagonal turnbuckle sleeve 130 (see also Fig. 4), which receives the inner ends of both spring pivot adjusting eye bolts 100 whose eyes are straddled on shafts 42 by the eyes of the spring clevis rods 38 (see Figure 2). The turnbuckle sleeve 130 is mounted in the center of the compound bell crank lever 30, 42 between a pair of bearings 132 for bolts 100 which are held in place by retainers 134 and screws 136. There is no hub block between the center portions of the two side bars 138 forming levers 42, allowing clearance for the turnbuckle. Two end cross braces 140 and the bearings 132 hold these lever bars 138 squarely together, as seen best in Figure 2.

The supporting arm 30 is formed by two wide spaced flat elements 140, having a foot shape as seen in profile in Figure 1. These elements 140 are spaced more widely than the lever bars 138 (see Fig. 4). Their toe portions are welded to the respective outsides of bars 138 by blocks 142 and their heel portions are welded to these bars by web pieces 144. The width of the arms 30 in the plane of their rotation provides for adjustability of the angular relationship of the pivots 29, 31, and 43 by permitting drilling of the hole for the pivot 29 in the position desired to provide the desired θ-shift correction for a particular installation.

Trunnions 31 formed by bolts 146 mount the lever assembly between frame sides 33, the elements 140 having Phosphor bronze bearing inserts freely turning on the bolts 146 which are mounted through collars 148 fixed to the side frames 33.

The outer ends of supporting-arm elements 140 are bracketed by a cross member 150, and dual load rod clevises 152 are pivoted to each of these ends by pin-secured shafts 29.

As seen in Figure 2, an advantage of the dual load rods 28 is greater stability for the load and a reduction in headroom requirement for the load connection pivots 26 are spaced toward the sides of the pipe.

Figure 5:
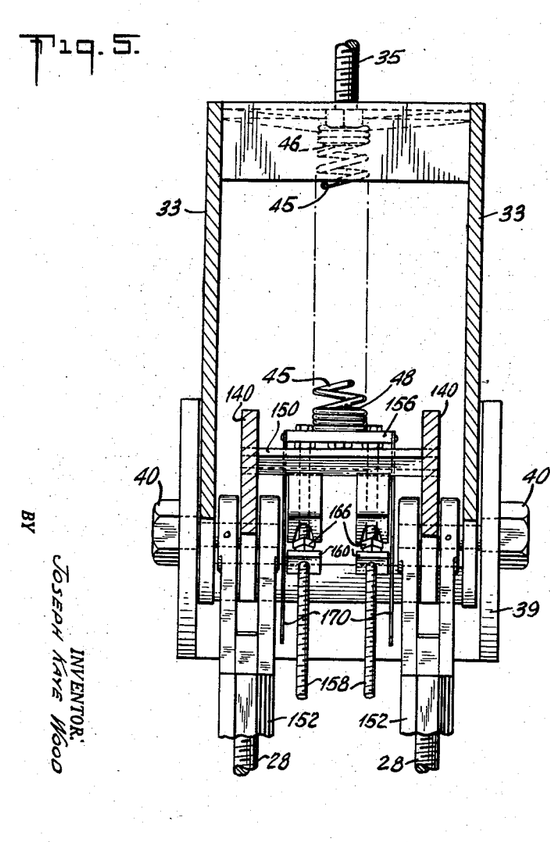
Figure 5 is a vertical cross section taken along the line 5—5 in Figure 6 looking toward the left and showing the operation of the auxiliary booster spring.
Figure 6:
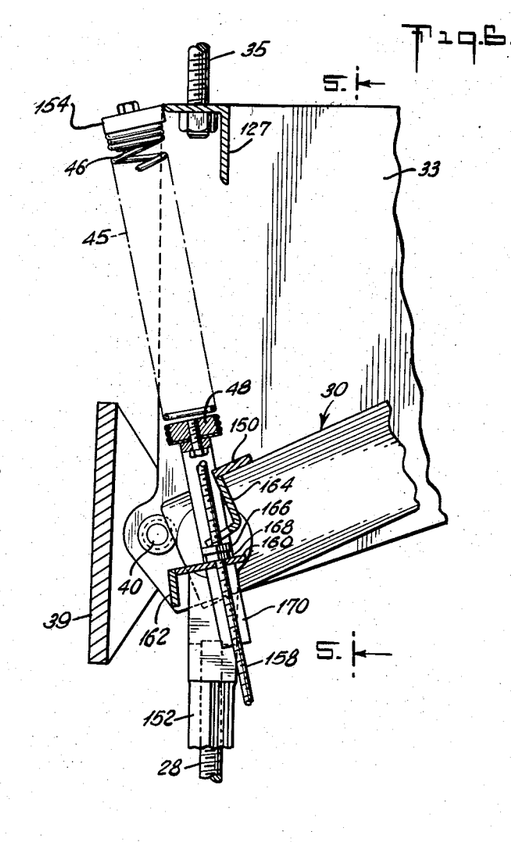
Figure 6 is a vertical longitudinal sectional view taken along the line 6—6 of Figure 4 looking upwardly.

The booster spring arrangement also differs from that in Figures 7–11. As shown in Figures 5 and 6, the spring 45 is fastened by an upper spring plug 46 to a lip 154 extending between side frames 33. The lower spring plug 48 supports a cross piece 156 with adjustment bolts 158 depending from each end through guide holes in a pair of tongues 160 (see Fig. 4) secured to a cross piece 162 (Fig. 6) between frame sides 33.

A pair of forks 164 project out and down from the supporting-arm cross member 150 (Fig. 5) with their bifurcated ends spaced to straddle the booster spring adjustment bolts 158 and engage square nuts 166 thereon backed up by hexagonal lock nuts 168. As seen in Figure 1, with supporting arm 30 in the high position, forks 164 are clear of bolts 158. As seen in Figure 3, in mid-position, the forks engage the tops of the square nuts, and as the load travels down toward low position, booster spring 45 is stretched. In extreme low position, arm 30 is stopped by locknuts 168 engaging tongues 160.

To indicate the position at which the booster spring comes into action by engagement of the forks and square nuts, a pair of scales 170 project down from the ends of booster cross piece 156, seen edge on in Figure 5 and broadside in Figure 3. These scales are marked on the inside 20—10—0—10—20 and are arranged so that the forks just touch the top surface of the square nut when the supporting arm is in mid-position and the support is adjusted for rated capacity. When adjusted to an increased capacity, say 8%, the square nuts are turned up until their top surfaces are aligned with the 8 mark on scales 170 so that the booster spring comes into action just a little before the mid-position, and vice versa when adjusted for less than rated capacity. The reading on scales 170 in general should be made to agree with the reading on scale 120.

The formulas, curves and diagrams discussed above apply to this support in the same manner as to the one shown in Figures 7–11. It may be noted that the spring anchoring pivots 40 are located in a more clockwise position around main pivot 31 with respect to the spring levers 42 than in Figure 7. This causes angle C to be larger than angle B and displaces the maximum of the spring moment curve from the 90° position of the load arm 130. However, in this case the adjusting nuts 72 and relaxed length of springs 36 and 36' are arranged so that H is not equal to zero and the resulting modification in the spring moment curve acts to compensate for the phase displacement of the spring moment curve relative to the load moment curve. Thus, this relocation of the angular position of the spring-anchoring pivots with respect to the main pivot has a $\theta$-shift effect like adjustment of the relative angular position of pivots 29 and 43 with respect to the main pivot. A radial adjustment of the spring anchoring pivots 40 toward and away from the main pivot, as shown in Figure 1 of my Patent No. 1,937,135 is not such a $\theta$-shift adjustment, but only changes the value of H as shown by the curves in Figure 5 thereof. The concepts of $\theta$-shift and H change are widely different as is apparent from the above analysis.

Figures 12, 13, 14:
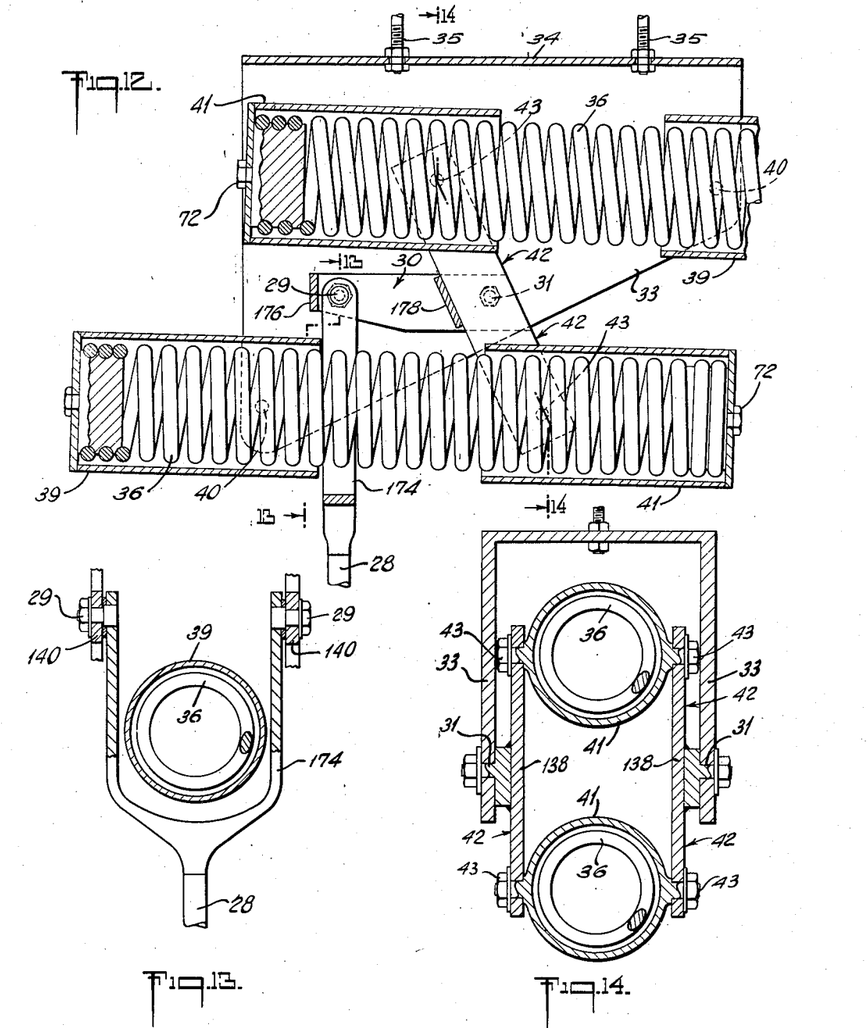
Figure 12 is a partially diagrammatic side elevational sectional view of another spring support embodying my invention and utilizing tension springs.
Figure 13 is a cross sectional view taken along the line 13—13 in Figure 12, looking to the right, showing the load-pivot end of the support arm.
Figure 14 is a cross sectional view taken along the line 14—14 in Figure 12, looking to the right.

In Figures 12, 13, and 14 is shown a modified form of constant-pull spring support, which is similar to the supports described and parts performing functions corresponding thereto are designated by like numbers. The overall length of this support is greatly reduced by the use of tension springs 36 mounted to extend through the spring lever arms 42 into trunnion-mounted spring sockets 39.

The load, not shown in these figures, is supported by a load rod 28 from a yoke 174 whose arms are spaced apart enough to clear spring 36 and its mounting and are hung by trunnions 29 from the end of a load-supporting arm 30.

For ease of fabrication the lever system including the arm 30 and the two spring levers 42 is of welded construction, made from sheet steel plate or strip. Across the free end of the supporting arm near the load pivot 29 is welded a spacer 176 and a pair of main pivot trunnions 31 are formed on the outside of the hub end of the load arm 30. The spring levers 42 are formed by two spaced bars 138, one of which is welded at an angle across the inside of the hub end of each of the two spaced straight elements 140 forming the load arm 30. A second spacer 178 is welded between the hub ends of load-arm elements 140 adjacent an edge of each of the spring level bars to reinforce the welded connection.

Among the advantages of this simple welded construction is that the entire space within the lever system 30, 42 is clear to receive the tension springs 36 and their mounting caps and trunnions. Spring plugs secure the ends of the springs within the pivoted cylinders. By placing these springs substantially entirely within the length of the side frame members 33 the length of the support is reduced, which combined with its low overhead requirement makes it well suited for use in confined spaces.

Although tension springs are used in this support instead of the compression springs used in the other supports, the operation of the two supports is similar, and therefore the formulas and curves discussed above also apply to this support. The definition of H is exactly the same as before, being the distance between either of the spring-anchoring pivots 40 and the corresponding lever spring pivots 43 if the springs were allowed fully to relax.

The diagrams of Figures 15a and 15b apply to this support, and thus, where desired, a $\theta$-shift arcing correction can be built into the support, for example, by drilling the bearing holes for the load rod yoke pivots 29 at positions on the load lever according to the specifications of the installation. Alternatively, the pivots 29 may be adjustable in position, for example, by a sliding block between elements 140 as used in Figures 10a and 10b, to enable the $\theta$-shift correction adjustment to be made by adjustable screws or bolts, in accordance with the disclosure herein.

I claim:

1. A spring support for exerting a constant supporting force upon a load movable upwardly and downwardly within a limited range and constrained to follow a predetermined path which may have combined vertical and horizontal components of motion comprising a frame, a lever assembly, said lever assembly having a load-supporting arm and first and second spring levers, a main pivot connecting said lever assembly to said frame, said spring levers extending on substantially diametrically opposite sides of said main pivot, an arcuate guide on said load-supporting arm concentric with said main pivot, a load pivot having an axis parallel with said main pivot and being adjustably mounted on said arm and arranged to follow said arcuate guide, adjusting means to move said load pivot along said arcuate guide concentric with the main pivot to adjust the angular relationship of said load pivot and said spring levers, means connecting the load to be supported to said load pivot so as to produce a turning moment on said lever assembly about said main pivot, first and second spring means, first anchoring means mounting said first spring means on said frame, second anchoring means mounting said second spring means on said frame, said first and second anchoring means being on substantially diametrically opposite sides of said main pivot and being substantially equally spaced therefrom, a first radial guide on said first spring lever, a second radial guide on said second spring lever, a first spring pivot having an axis parallel with said main pivot and being adjustable along said first radial guide, a second spring pivot having an axis parallel with said main pivot and being adjustable along said second radial guide, said first spring means being connected between said first spring pivot and said first anchoring means, said second spring means being connected between said second spring pivot and said second anchoring means, whereby the turning moments of said first and second spring means on said lever system add up about said main pivot to oppose the load turning moment while the radial strut forces exerted by said first and second spring means on said lever system oppose each other and cancel each other out so as to produce substantially no resultant spring force on said main pivot, an adjusting member arranged to move each of said spring pivots along its respective radial guide to control said spring turning moments, for regulating the load capacity of the support, indicator means on one of said adjustable spring pivots adjacent a portion of said frame to show the load capacity adjustment, an auxiliary spring actuable by said load-supporting arm at a point along the path of travel of said load-supporting arm, said auxiliary spring being connected to said frame at a position generally above said load-supporting arm, and screw means for adjusting the point at which said load-supporting arm actuates the actuation of said auxiliary spring.

2. A spring support for exerting a constant supporting force upon a load movable upwardly and downwardly within a limited range comprising a frame, a compound lever comprising a load-supporting arm and first and second spring levers, a main pivot connecting said compound lever to said frame, said spring levers being on substantially diametrically opposite sides of the main axis of said main pivot, a load pivot having an axis parallel to the main axis and connecting the load to said load supporting arm at a point spaced from said main pivot, first and second spring means, first spring-anchoring pivot means having an axis parallel to said main axis and pivotally mounting said first spring means on said frame, and second spring-anchoring pivot means having an axis parallel to said main axis and pivotally mounting said second spring means on said frame, said first and second spring-anchoring pivot means being on substantially diametrically opposite sides of said main pivot axis, said first spring means being connected to said first spring lever at a point spaced from said main pivot and exerting a moment on said lever in the opposite angular direction thereabout from that of the connection of said load, said second spring means being connected to said second spring lever at a point spaced from said main pivot and exerting a moment on said lever in the same angular direction thereabout as said first spring means, so that the turning moments of said first and second spring means add together to oppose the load turning moment, while the radial components of the forces of said spring means exerted on said spring levers towards the main pivot are substantially equal and opposite so as to cancel out, whereby the first and second spring means produce substantially no resultant force on said main pivot.

3. A spring support for exerting a constant vertical pull on a load movable upwardly and downwardly within a limited range, comprising a frame, a lever having at least a load arm, a spring arm and a main pivot mounting said lever on said frame, spring means, anchoring means on the frame to which the spring means are connected, a spring pivot having its axis parallel with said main pivot and connecting the spring means to the spring arm of said lever so as to produce a turning moment about the main pivot, a load pivot on said load arm having its axis parallel with said main pivot, adjusting means for moving one of the latter two pivots on one of said arms angularly about said main pivot with respect to the other of the latter two pivots while maintaining constant the distance between said one pivot and said main pivot, and a connection for the load to said load pivot producing a load turning moment on said load arm about the main pivot opposed to the turning moment of said spring means on said spring arm.

4. A spring support for exerting a constant vertical pull on a horizontal pipe load movable upwardly and downwardly within a limited range and having a reduced headroom requirement, comprising a frame, a lever having a pair of parallel load arms and a spring arm, a main pivot mounting said lever on said frame, spring means, anchoring means on the frame to which the spring means are connected, a spring pivot having its axis parallel with the main pivot connecting the spring means to the spring arm of said lever so as to produce a turning moment about the main pivot, a pair of axially spaced load pivots, one on each of said load arms and having their axes aligned and parallel with the main pivot and being at equal radial distances from said main pivot, a pipe clamp for surrounding the pipe load and having a second pair of load pivots in axial alignment with one another and spaced on opposite sides of the pipe clamp with the upper curve of the pipe clamp bowing up between said second pair of load pivots, and a pair of mechanical links between corresponding pivots of said first and second pair of pivots, whereby the pipe load is enabled to bulge up between said second pair of pivots and headroom requirements are reduced.

5. A spring support for exerting a constant vertical pull on a load movable upwardly and downwardly within a limited range, comprising a frame, a lever having at least a pair of arms, a main pivot mounting said lever on said frame, spring means, anchoring means on the frame to which the spring means are connected, a member movably mounted on one of said arms and movable transversely of said one arm in a plane perpendicular to the axis of the main pivot, a pair of pivot connections having their pivot axes parallel with the axis of the main pivot and perpendicular to said plane, one of said pivot connections being carried by said member and the other pivot connection being carried by the other of said arms, means connecting the spring means to one of said pivot connections so as to produce a turning moment on the lever about said main pivot, means connecting the load to be supported to other of said pivot connections so as to produce a turning moment on the lever about said main pivot opposed to said spring moment, guide means defining an arcuate path in said plane and concentric about said main pivot, said one pivot connection engaging and being movable along said guide means, and adjusting means connected between said member and said one arm for adjusting said member transversely of said one arm for adjusting said one pivot connection along said guide means in said plane and concentric about said main pivot, thereby to adjust in said plane the angle at the main pivot between said pivot connections.

6. A spring support for exerting a constant supporting force upon a load movable upwardly and downwardly within a limited range and constrained to follow a predetermined path which may have combined vertical and horizontal components of motion comprising a frame, a lever assembly, said lever system having a load-supporting arm and first and second spring levers, a main pivot connecting said lever assembly to said frame, said spring levers being on substantially diametrically opposite sides of the axis of said main pivot, means connecting the load to be supported to said load-supporting arm so as to produce a turning moment about said main pivot, first and second spring means, first anchoring means mounting said first spring means on said frame, second anchoring means mounting said second spring means on said frame, said first and second anchoring means being on substantially diametrically opposite sides of said main pivot axis and being substantially equally spaced therefrom, a first guide on said first spring lever, a second guide on said second spring lever, a first adjustable pivot having its axis parallel to said main pivot axis and engaging said first guide, a second adjustable pivot having its axis parallel to said main pivot axis and engaging said second guide, said first spring means being connected to said first adjustable pivot so as to exert a first force on said first spring lever producing a turning moment about said main pivot opposed to the turning moment of said load, said second spring means being connected to said second adjustable pivot so as to exert a second force on said second spring lever substantially equal to said first force and opposite in direction thereto and producing a turning moment about said main pivot opposed to the turning moment of said load, whereby the turning moments of said first and second spring means add up to oppose the load turning moment while the radial strut forces exerted by said first and second spring means on said lever system oppose each other and cancel out so as to produce substantially no resultant force on said main pivot, and an adjusting member arranged to move each of said adjustable pivots along its respective guide to control said turning moments.

7. A spring support as claimed in claim 6 and wherein said adjusting member for each of said adjustable pivots is a threaded shaft, each shaft having its outer end engaging its pivot, and a turnbuckle element treaded onto the inner end of each shaft, thereby enabling simultaneous and corresponding adjustment of said adjustable pivots to control said turning moments of said first and second spring means while maintaining said radial strut forces opposed and cancelled out.

8. A spring support for exerting a constant vertical pull on a load movable up and down within a limited range and constrained to follow a path having combined vertical as well as horizontal components of motion, comprising a frame, a lever system including a load arm and a spring arm, a main pivot mounting said lever system on said frame, spring means, a first pivot connection on the frame to which said spring means are anchored, a second pivot connection on said spring arm connecting said spring means thereto for producing a turning moment on the lever system about the main pivot, a third pivot connection on said load arm connecting the load thereto, for producing a turning moment on the lever system about the main pivot opposed to said spring moment, all of said pivot connections having their axes parallel with said main pivot, said spring means having deflection approximately equal to the distance between said first and second pivot connections, said spring turning moment having a maximum within said limited range, said lever assembly being rotatable about said main pivot in response to vertical and horizontal components of movement of the load with said load arm being movable along an arcuate path about said main pivot between positions above the horizontal and positions below the horizontal, the turning moment of said load having a maximum within said limited range, at least one of said arms having a substantial width enabling the arrangement of the angular position of the associated pivot connection around said main pivot to shift the angular position of the maximum of one of said turning moments with respect to the other to provide a more nearly constant vertical component of load-supporting pull, an auxiliary spring means mounted on said frame near to said lever system, and coupling means engaging between said lever system and said auxiliary spring means and responsive to movement of said lever system to initiate deflection of said auxiliary spring means with said lever system at an angular position about said main pivot corresponding approximately to the maximum of one of said turning moments.

9. A spring support as claimed in claim 8 and including a load capacity adjustment means associated with at least one of said spring-arm pivots on said lever and arranged to adjust said one spring-arm pivot toward or away from said main pivot, a first indicator element coupled to said one spring-arm pivot and movable therewith along an arcuate path about said main pivot as said lever rotates in response to load movement, said indicator element coupled to said one spring-arm pivot and also movable toward and away from said main pivot in response to adjustment in said load capacity, and a second indicator element on said frame having an arcuate scale thereon concentric about said main pivot and adjacent to said first indicator element and adapted to cooperate with said first indicator element to indicate both the position of said lever system and the load capacity adjustment.

10. A spring support as claimed in claim 9 and including an auxiliary spring adjustment to regulate the angular position about said main pivot at which said auxiliary spring means engages said lever system, and an indication scale associated with said auxiliary spring adjustment calibrated in accordance with said load capacity indicator elements.

11. A spring support for exerting a constant vertical pull on a load movable up and down within a predetermined range, comprising a frame, a lever system including at least a load-supporting arm and a spring arm, a main pivot rotatably mounting said lever system on said frame, spring means, a first pivot connection anchoring said spring means to the frame, a second pivot connection from said spring means to said spring arm whereby to produce a turning moment of said lever system about the main pivot, and a third pivot connection connecting the load to said load-supporting arm for exerting a moment about the main pivot opposed to the spring moment, the axes of all of said pivot connections being parallel to the main pivot, said lever system being rotatable about said main pivot and swinging said load arm along an arc passing through a horizontal position, the actual effective moment exerted by said load on said lever system having a maximum within said predetermined range, said maximum occurring when the load-supporting arm is near the horizontal position, said spring arm also moving along an arcuate path, crossing the position at which a line from the main pivot to said second pivot is perpendicular to the line from the main pivot to the first pivot, the moment exerted by said spring means on said lever system having a maximum within said predetermined range, said latter maximum also occurring when the load-supporting arm is near the horizontal position at least one of said pivot connections being in an adjusted position relative to the others, about said main pivot for producing a constant ratio between said effective load moment and said spring moment for positions of said load supporting arm above the horizontal, and an auxiliary spring having two ends, anchoring means for connecting one end of said auxiliary spring to the frame, engaging means connected to the other end of said auxiliary spring and engaging said lever system, said auxiliary spring being stressed by said lever system when said load-supporting arm swings below its horizontal position, so as to increase the spring moment, in the travel of said load-supporting arm below the horizontal, for producing a constant ratio between said effective load moment and said spring moment for positions of said load-supporting arm below its horizontal position, and thus obtaining a more constant vertical pull on said load.

12. A spring support of the type wherein a substantially constant pull is exerted on a load movable up and down within a predetermined range comprising a frame, a lever system including at least a load arm and a spring lever, a main pivot rotatably mounting said lever system on said frame, spring means, a first pivot connection anchoring said spring means on the frame, a second pivot connection on said spring lever connecting said spring means thereto to exert a turning moment on said lever system about said main pivot, a third pivot connection on said load arm connecting the load thereto to exert a turning moment on said lever system about said main pivot opposed to the turning moment of said spring connection, the axes of said pivot connections being parallel to the axis of the main pivot, said load arm during operation being moved along an arcuate path both above and below the horizontal, the actual effective moment arm of said load in said movement having a maximum when the load arm is near the horizontal and decreasing as the load arm moves away from the horizontal toward the limits of said arcuate path above and below the horizontal, the exact position of the maximum of said actual effective moment being affected by deviation from the vertical of the pull of the load upon said third pivot connection on said load arm, the turning moment exerted by said spring means on said lever system having a maximum, the angle at said main pivot between a pair of lines extending from the main pivot to said second and third pivot connections on, respectively, the spring lever and load arm being different from the angle at the main pivot between the vertical and a line drawn from the main pivot to said first pivot connection by an angular difference equal to the largest angular deviation from the vertical of the pull of the load upon said third pivot connection, auxiliary spring means having two ends, one of said ends being secured to said frame, coupling means engaging between the other end of said auxiliary spring and said lever system, said auxiliary spring being responsive to movement of said lever system to deflect said auxiliary spring means with said lever system at a predetermined position when said load arm swings below its horizontal position, and adjusting screw means for adjusting the distance between the point at which said auxiliary spring is secured to the frame and said coupling means to predetermine the position of engagement of said coupling means.

13. A spring balanced hanger for supporting a load movable up and down comprising a frame having a main pivot, a body rotatable about said main pivot, the load being connected to said body by a first pivot connection spaced radially from said main pivot thereby to exert a load moment on said body about said main pivot, spring means connected to said body by a second pivot connection spaced radially from said main pivot and connected to said frame by pivot anchoring means, and arranged to exert a spring moment on said body about said main pivot opposed to said load moment, the axes of said pivot connections and of said pivot anchoring means being parallel with the axis of said main pivot, load capacity adjusting means on said body, the position of said load capacity adjusting means being adjustable in a direction parallel to a line between said main pivot and one of said pivot connections and being coupled to said one connection to adjust the radial position of said one connection toward and away from the main pivot, an arcuate scale on said frame having graduations arranged along an arcuate line concentric about said main pivot, an indicator connected to said adjusting means and extending closely adjacent said scale and overlapping said scale, said indicator including graduations at different radial distances from said main pivot, said indicator being adjusted in position radially in accordance with the adjustment of said adjusting means and swinging about said main pivot with said body, said indicator swinging along said arcuate scale as said body rotates, whereby said arcuate scale and indicator indicate both the angular position of said body and the adjustment of the load capacity adjusting means.

14. A spring balanced hanger as claimed in claim 13 and wherein said body includes a load arm carrying said first pivot connection and a spring arm carrying said second pivot connection and said load capacity adjusting means is coupled to said second pivot connection, and including a third arm in said body diametrically opposite said second arm with respect to the main pivot, said indicator being carried by said third arm.

15. A balanced spring support for exerting a substantially constant supporting force on a load constrained to move upwardly and downwardly within a predetermined range of movement and wherein the main pivot is relieved of any substantial force caused by the spring means, said balanced support comprising a frame, a main pivot carried by said frame, a body rotatably mounted on said main pivot, a load pivot carried by said body spaced from said main pivot and having its axis parallel with said main pivot, load-supporting means carried by said load pivot floor supporting a load and arranged to exert a turning moment about said main pivot in a predetermined direction, a pair of spring pivots carried by said body spaced equal distances from said main pivot on diametrically opposite sides of said main pivot and having their axes parallel with said main pivot, a pair of spring-anchoring pivots on said frame spaced equal distances from said main pivot and on diametrically opposite sides of said main pivot and having their axes parallel with said main pivot, a pair of spring means each connected between one of said spring pivots and a corresponding anchoring pivot, said spring means being on diametrically opposite sides of said main pivot and exerting a turning moment on said body balanced about said main pivot and opposed to said load moment whereby said main pivot is relieved of any substantial force caused by said spring means.

16. An adjustable balanced spring support for exerting a substantially constant supporting force on a load constrained to move upwardly and downwardly within a predetermined range of movement comprising a frame, a main pivot carried by said frame, a body rotatably mounted on said main pivot, a load pivot carried by said body spaced from said main pivot and having its axis parallel with said main pivot, load-supporting means carried by said load pivot for supporting a load and arranged to exert a turning moment about said main pivot in a predetermined direction, a plurality of spring pivots carried by said body spaced from said main pivot and having their axes parallel with said main pivot, said spring pivots being equally spaced about said main pivot, the positions of said spring pivots being adjustable toward and away from said main pivot, guide means on said body for guiding said spring pivots during adjustment, a threaded rod secured to each of said spring pivots and each extending inwardly toward said main pivot, and a mating screw member near the inner ends of said rods for correspondingly adjusting said spring pivots to maintain them substantially equally spaced from said main pivot, a plurality of spring-anchoring pivots on said frame spaced equally around said main pivot and having their axes parallel with said main pivot, a plurality of spring means each connected between one of said spring pivots and a corresponding anchoring pivot, said spring means exerting turning moment on said body opposed to said load pivot and balanced about said main pivot, whereby said main pivot is relieved of any substantial force caused by said spring means.

17. A spring support for exerting a constant vertical pull on a pipe or similar load constrained to move upwardly and downwardly within a limited range with changes in temperature, said spring support comprising a frame, a lever having at least a load arm and a spring arm, a main pivot rotatably mounting said lever on said frame, spring means, anchoring means on the frame to which the spring means are connected, a spring pivot carried by said spring arm and having its axis parallel with the main pivot and connecting the spring means to the spring arm of said lever, said spring means producing a turning moment about the main pivot, a load pivot carried by said load arm and having its axis parallel with the main pivot, load supporting means for connecting the load to the load pivot for producing a turning moment about the main pivot opposed by the spring moment, arcuate guide means on one of said arms engaging the pivot on said one arm, said arcuate guide means being concentric about the main pivot, the position of the pivot on said one arm being adjustable along said guide means concentric about the main pivot, for changing the angle between the load pivot and the spring pivot, said angle being measured at the main pivot in a plane perpendicular to the main pivot, said arcuate guide means maintaining substantially constant the radial distance from the main pivot to said one pivot which is adjustable in position, and releasable holding mechanism connected between said one pivot and said one arm for holding said one pivot in its adjusted position along said arcuate guide means.

18. A balanced support for supporting piping and similar loads constrained to move upwardly and downwardly within a limited range, said support having a frame, a main pivot on said frame, and a lever carried by said main pivot and wherein the load turning moment exerted on said lever by the load is opposed by spring means balanced to produce substantially no resultant spring force on said main pivot, said lever including a load-supporting arm and first and second spring arms extending on substantially diametrically opposite sides of said main pivot, a load pivot having its axis parallel with said main pivot and connecting the load to said load-supporting arm at a point spaced from said main pivot, first and second spring means, first and second spring-anchoring pivot means having their axes parallel with said main pivot and pivotally mounting said first and second spring means, respectively, on said frame, said first and second anchoring pivot means being on substantially diametrically opposite sides of said main pivot, first and second spring-arm pivots equally spaced from said main pivot and carried on said first and second spring arms, respectively, and having their axes parallel with said main pivot, the turning moments of said first and second spring means on said arms adding together to oppose the load turning moment on said load arm, and the radial forces of said first and second spring means on said spring arms being equal and opposite with respect to said main pivot and producing substantially no resultant spring force on said main pivot.

19. An adjustable spring support for exerting a constant vertical pull on a pipe or similar load constrained to move upwardly and downwardly within a limited range with changes in temperature, said support being adjustable for different load capacities and including indicator means showing simultaneously the load-capacity adjustment and the load position: said spring support comprising a frame, a lever having at least a load arm and a spring arm, a main pivot rotatably mounting said lever on said frame, spring means, anchoring means on the frame to which the means are connected, a spring pivot carried by said spring arm and having its axis parallel with the main pivot and connecting the spring means to the pivot on the spring arm for producing a turning moment about the main pivot, a pivot carried by said load arm and having its axis parallel with the main pivot, load supporting means for connecting the load to the pivot on the load arm for producing a turning moment about the main pivot opposed by the spring moment, radial guide means on one of said arms engaging the pivot on said one arm and directed radially along said arm with respect to the main pivot, the radial position of said one pivot being adjustable along said guide means toward and away from the main pivot, adjusting mechanism connected between said one pivot and said lever for adjusting said position, a first indicator element having a scale thereon, said scale extending in a direction radially out from the main pivot, said indicator element being coupled to said one pivot and moving radially toward and away from the main pivot in response to the adjustment of said one pivot radially along said guide means, said first indicator element also swinging along an arcuate path about said main pivot as said lever swings about said main pivot, and a second flat indicator on said frame lying closely adjacent and parallel to the plane of the arcuate path travelled by said first indicator element, said second indicator including a scale extending along an arcuate path concentric about said main pivot and effectively intersecting with said first indicator element showing simultaneously load capacity adjustment and angular position of said lever.

20. A spring balanced device for exerting a substantially constant force on a load movable over a limited range of movement including a frame, a lever system and a main pivot which mounts said lever system in the frame, said lever system having a load arm, a load pivot carried by the load arm and having an axis parallel with the main pivot, and a load-supporting member carried by the load pivot exerting a load moment on the load arm, said lever system being rotatable back and forth about the axis of the main pivot, said lever system having the friction at the main pivot reduced by balancing the spring forces about the main pivot so that components of the spring forces exerted on the lever system cancel each other out and relieve the main pivot of such spring forces, said lever system having a plurality of spring arms extending radially out from the main pivot in different directions and positioned at uniformly spaced intervals about the main pivot, a plurality of spring pivots having their axes parallel with the main pivot and each spaced at the same distance from the main pivot, one of said spring pivots being carried by each of said spring arms, a plurality of anchoring pivots on the frame having their axes parallel with the main pivot and each spaced at the same distance from the main pivot, said anchoring pivots being positioned in different radial directions from the main pivot and being at uniformly spaced intervals about the main pivot, a plurality of susbtantially identical springs each connected between one of said anchoring pivots and a respective one of said spring pivots so that the components of spring forces exerted by said springs on the lever system cancel each other out at the main pivot, thereby to relieve the main pivot of spring force, said springs exerting turning moments on the respective radial spring arms about said main pivot which aid each other and oppose the load moment.

References Cited in the file of this patent

UNITED STATES PATENTS

| | | |
|---|---|---|
| 2,256,784 | Wood | Sept. 23, 1941 |
| 2,480,864 | Loepsinger | Sept. 6, 1949 |
| 2,615,708 | Rouverol | Oct. 28, 1952 |
| 2,709,057 | Gould | May 24, 1955 |